(12) United States Patent
Gesto (10) Patent No.: US 12,103,341 B1
(45) Date of Patent: Oct. 1, 2024

(54) TIRE SERVICING CAGE

(71) Applicant: Pro-Tote Systems, Inc., South Bend, IN (US)

(72) Inventor: James Gesto, South Bend, IN (US)

(73) Assignee: Pro-Tote Systems, Inc., South Bend, IN (US)

( * ) Notice: Subject to any disclaimer, the term of this patent is extended or adjusted under 35 U.S.C. 154(b) by 0 days.

(21) Appl. No.: 18/191,554

(22) Filed: Mar. 28, 2023

(51) Int. Cl.
*B60C 25/14* (2006.01)
*B60S 5/04* (2006.01)

(52) U.S. Cl.
CPC .............. *B60C 25/147* (2013.01); *B60S 5/04* (2013.01); *B60B 2900/3313* (2013.01); *B60B 2900/3314* (2013.01)

(58) Field of Classification Search
CPC .. B60C 25/147; B60S 5/04; B60B 2900/3314
USPC ................ 157/14, 15, 16, 17, 18, 19, 20, 21
See application file for complete search history.

(56) References Cited

U.S. PATENT DOCUMENTS

| | | | | |
|---|---|---|---|---|
| 1,704,440 A * | 3/1929 | Little | ...................... | B29D 30/12 |
| | | | | 156/417 |
| 3,785,424 A * | 1/1974 | Rishovd | ................ | B60C 25/145 |
| | | | | 157/1.1 |
| 4,183,392 A * | 1/1980 | Kane | ...................... | B60C 25/145 |
| | | | | 157/1.1 |
| 4,381,027 A * | 4/1983 | Molen | ................... | B60C 25/147 |
| | | | | 157/1 |
| 5,031,476 A * | 7/1991 | Isogai | ..................... | B65G 69/24 |
| | | | | 74/536 |
| 7,240,713 B2 * | 7/2007 | Munroe | ................ | B60C 25/147 |
| | | | | 157/1 |
| 8,701,736 B2 * | 4/2014 | Lawson | ................ | B60C 25/145 |
| | | | | 157/1.1 |
| 9,248,711 B2 * | 2/2016 | Bilodeau | ............... | B60C 25/147 |
| 2005/0082013 A1 | 4/2005 | White | | |

(Continued)

FOREIGN PATENT DOCUMENTS

| | | |
|---|---|---|
| CN | 207089347 U | 3/2018 |
| CN | 210882056 U | 6/2020 |

(Continued)

OTHER PUBLICATIONS

"Safety inflation cage IC Box", M&B Engineering SRL, 2 pages, <https://www.mbengineering.info/en/safety-cage/safety-inflation-cage-ic-box/>, last visited Mar. 28, 2023.

(Continued)

*Primary Examiner* — Makena S Markman
(74) *Attorney, Agent, or Firm* — Lathrop GPM LLP; Richard Beem; Alex Shtraym (57) ABSTRACT

The present invention relates generally to tire servicing operations and, more specifically, to a tire servicing cage for maintaining, repairing, changing, and inflating tires. The servicing cage may include a frame assembly secured to a base plate. A counterweight assembly may be coupled to the frame assembly to assist with moving the cage from an open position to a closed position. Further, the base plate may include a post member having a pivoting head configured to receive a rim of a tire. Advantageously, the servicing cage may prevent debris from discharging outside of frame assembly and accommodate maintaining, repairing, changing, and inflating wheel assemblies of different diameters.

18 Claims, 10 Drawing Sheets

(56) References Cited

U.S. PATENT DOCUMENTS

| | | | |
|---|---|---|---|
| 2005/0189773 A1* | 9/2005 | Tsai | E05B 17/0025 |
| | | | 292/241 |
| 2014/0034662 A1* | 2/2014 | Chalmers | B65D 90/0033 |
| | | | 220/737 |
| 2014/0305538 A1* | 10/2014 | Story | B60S 5/043 |
| | | | 141/38 |
| 2020/0062053 A1* | 2/2020 | Dépelteau | B60C 25/145 |
| 2021/0282879 A1* | 9/2021 | Thomas | A61B 50/30 |

FOREIGN PATENT DOCUMENTS

| | | |
|---|---|---|
| CN | 211196157 U | 8/2020 |
| WO | 00/68030 A1 | 11/2000 |

OTHER PUBLICATIONS

"TBR 1200 Safety Inflation Cage", Ahcon DK, 3 pages, <https://ahcon.dk/en/products/wheel-service-equipment/safety-inflation-cages/tbr-1200-safety-inflation-cage>, last visited Mar. 28, 2023.
"Automatic Safety Inflation Cage: Model WS-35026", Ari-Hetra, 1 page, <www.ari-hetra.com>, last visited Mar. 28, 2023.

\* cited by examiner

TIRE SERVICING CAGE

FIELD OF INVENTION

The present invention relates generally to tire servicing operations and, more specifically, to a tire servicing for maintaining, repairing, changing, and inflating tires.

BACKGROUND OF THE INVENTION

Large vehicles such as trucks, tractors, trailers, buses and off-road machines often require servicing after prolonged periods of use, damage or for various other reasons. Servicing of such vehicles often includes the replacement and/or inflation of wheel assemblies, which may include a tire mounted on a rim.

Generally, the replacement of a tire is a simple operation that includes extracting the valve stem to release air from the inner tube. Once discharged, the tire may be removed from the rim. An operator may then use a bead seater to form a seal between the rim and new tire, allowing the air pressure to force the beads into the rim flange.

The inflation of a tire, however, often requires additional considerations and precision due to the large pressures required to inflate a tire. For instance, defective tires or those that are improperly seated on the rim may burst or be blown off the rim during inflation. Such explosions often result in violent forces caused by released air, tire debris, the rim, and other wheel components.

Conventional tire cages typically include tire stops to prevent a tire from rolling out of the cage. Further, conventional tires cages often include bars spaced a distance apart to contain large components—such as the rim—during explosions. Such tire cages, however, may not be configured to contain smaller scraps and debris. Also, traditional cages are designed such that an operator is required to work in close proximity to the tire. Further, conventional tire cages are often unreliable and may need to be frequently replaced.

Accordingly, there is a need for an improved cage that facilitates maintaining, repairing, changing, and inflating tires effectively and efficiently. The present invention satisfies this need.

SUMMARY OF THE INVENTION

The present invention relates generally to tire servicing operations and, more specifically, to a tire servicing for maintaining, repairing, changing, and inflating tires.

In one aspect, the tire servicing cage may include a frame assembly secured to a base plate. The frame assembly may include a plurality of bars defining a top section, side section, a front section, and a rear section. It is further contemplated that one or more sections of frame assembly may include a layer of mesh material. Mesh material may be an expanded metal configured to prevent debris from discharging outside the frame assembly.

Tire servicing cage may further include a counterweight assembly coupled to said top section. Counterweight assembly may be configured to facilitate moving frame assembly between a closed configuration and an open configuration. Counterweight assembly may include a compartment configured to receive a dense substance, such as sand. Further, counterweight assembly may include one or more biasing members. Biasing members may be configured to provide an upward bias to facilitate moving the frame assembly to the closed configuration with minimum force.

The base plate may extend past the rear section of frame assembly. In addition, base plate may include one or more buffers configured to absorb impact with the counterweight assembly.

Moreover, the base plate may include a post member configured to receive a wheel assembly including a tire and a rim. Post member may extend upwardly from base plate and include a pivotable head. In particular, the head may pivot between a receiving position and a servicing position. In the receiving position, an operator may lean the wheel assembly against the head. In the receiving position, the head is substantially parallel to the base plate.

Further, the post member may include a central channel configured to receive an air hose for inflating or deflating the tire. The inflation and/or deflation of the tire may be controlled via a control panel secured to the exterior of the frame assembly. Control panel may include one or more controls configured to open and close one or more feed lines. Feed lines may correspond to a regulated air valve, and unregulated air valve, and a bleed valve.

Tire servicing cage may also include a locking mechanism configured to detachably secure the front section to side section of the frame assembly. The locking mechanism may include one or more jaws movable by a manual actual. In particular, the actuator may be configured to transmit motion to the one or more jaws via a leaf spring to facilitate securing or releasing the jaws to one or more pins of the frame assembly.

Further, the top section of frame assembly include an opening. Opening may be surrounded by vertical and horizontal bars that form a raised barrier around the opening. Top section may also include a plurality of angled panels configured to deflect debris discharged from an interior of frame assembly.

In another aspect, tire servicing cage may removably couple with a bead seating device configured to direct pressurized gas into an interior cavity of tire. Bead seating device may include an inlet. Inlet may include an intake end configured to receive pressurized gas, such as from an air source. Inlet may include a valve configured to control a flow of the pressurized gas.

Further, inlet may include a supply end configured to couple with a splitter. The splitter may be configured to split a stream of pressurized gas into a plurality of outlet streams. In particular, the splitter may be coupled to two or more outlets extending radially from the splitter. Each outlet may include a leg and a nozzle. It is contemplated that each leg may be extendable relative to each corresponding outlet. Moreover each nozzle may be angled to direct pressurized gas for seating the tire bead.

Additional components of the bead seating device may include a shell, handgrip, and screens. The shell may be semicircular in shape and configured to be removably coupled to the tire servicing cage. Further, the shell may encompass the splitter and portions of the inlet and outlets. In particular, the inlet may extend upwardly from a top of the shell. Outlets may extend outwardly from the shell.

The handgrip may be secured to at least two outlets. An operator may hold the bead seating device via the handgrip to position the nozzles with minimum effort into a cavity of a tire. Further, the device may include one or more screens. Screens may be arranged between the outlets and secured to one another via straps. It is contemplated that screens may be made of a clear material, such as acrylic to allow for visibility. Further, screens may be configured to deflect pressurized air and debris during operation of the device.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the present invention, where like designations denote like elements, and in which.

DETAILED DESCRIPTION OF THE INVENTION

The present invention relates generally to an improved cage for tire servicing operations. In particular, through use of the cage of the present disclosure, a user may maintain, repair, inflate, change, and secure a tire effectively and efficiently. The figures illustrate different views of an exemplary tire servicing cage.

Figure 15:
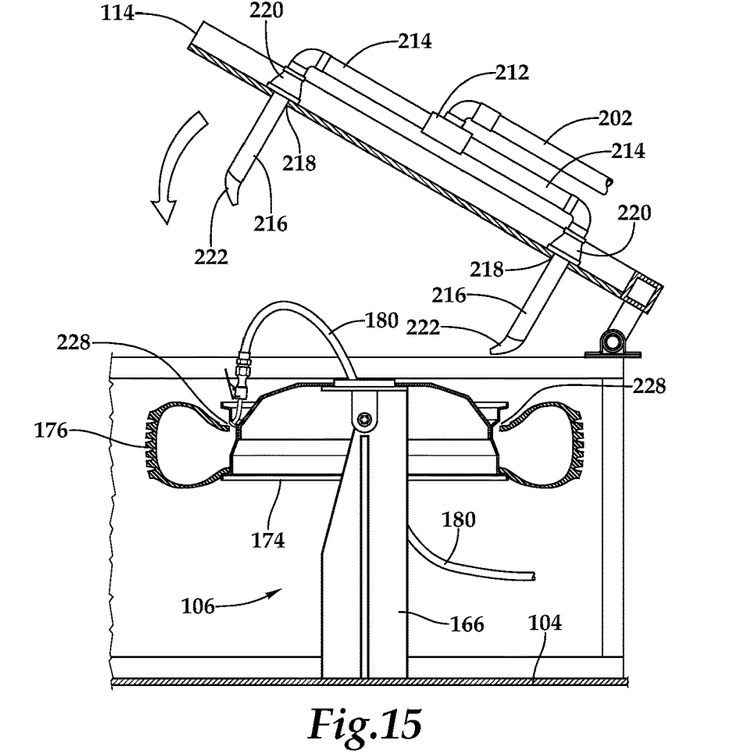
FIG. 15 illustrates the cage of FIG. 1 in an open configuration including the bead seating device of FIG. 12.

FIG. 1 through FIG. 17 illustrate an exemplary tire servicing cage 100. As shown, cage 100 may include a frame assembly 102 secured to a base plate 104 including a post member 106. Further, frame assembly 102 may be rotatably coupled with a counterweight assembly 108. Counterweight assembly 108 may be configured to facilitate moving cage 100 between a closed position 110 (FIG. 3 and FIG. 16) and an open position 112 (FIG. 4 and FIG. 15).

When cage 100 is in open position 112, an operator may roll a tire onto base plate 104 and lean the tire rim against a circular head 107 of post member 106. The weight of the tire may cause circular head 107 to pivot upwardly and support the tire in a position substantially parallel to base plate 104. Then, the operator may move cage 110 from open position 112 to closed position 110 and perform servicing operations, such as inflating the tire.

Components of cage 100 may be made of steel or another metal sufficiently rigid to withstand large forces without bending. It is further contemplated that cage 100 may be made of a corrosion resistance material, such as stainless steel, copper, bronze, or other alloys. While cage 100 is shown to be substantially square or rectangular in shape, other shapes are contemplated, such as a circular shape.

Frame Assembly 102

Figure 1:
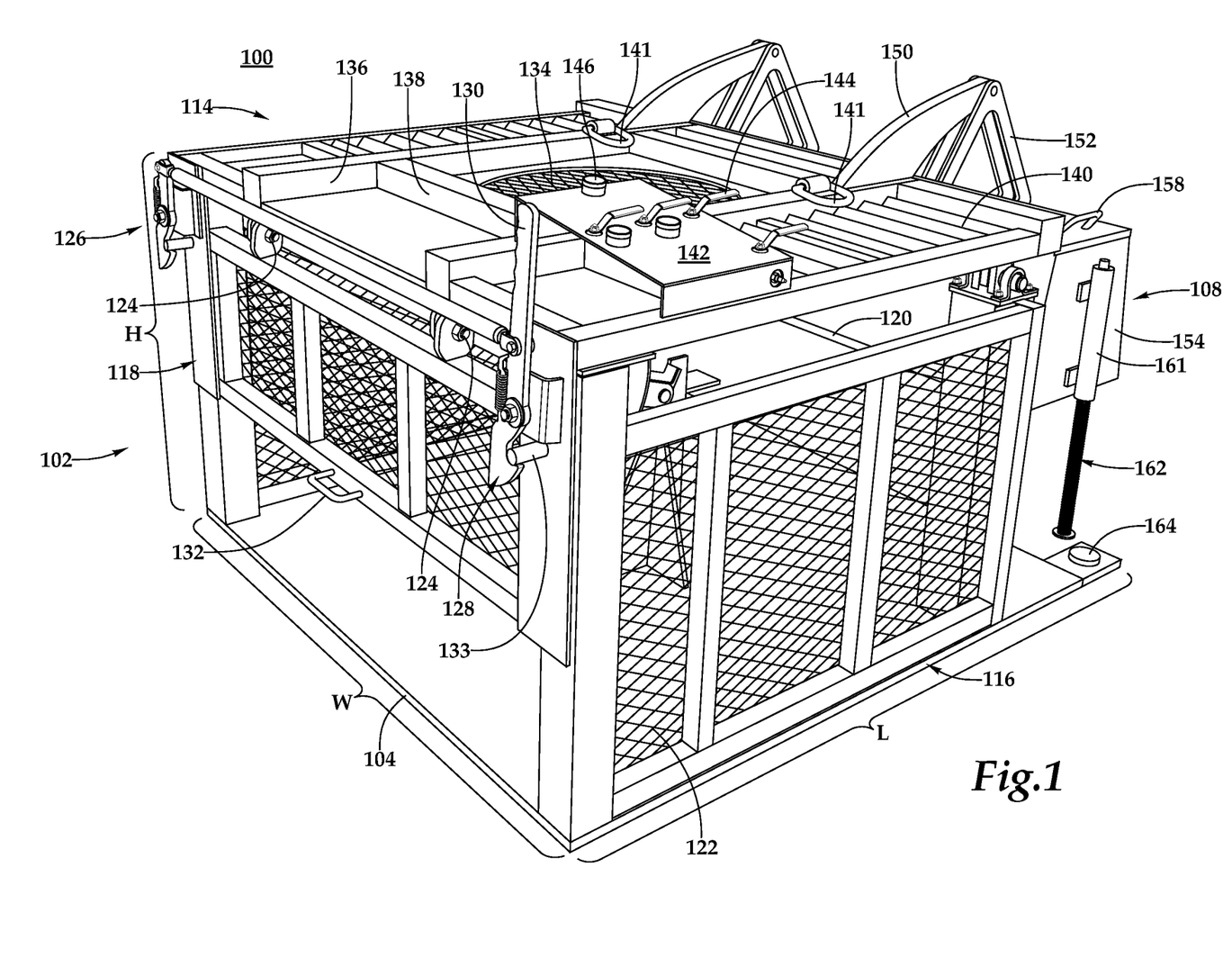
FIG. 1 is a perspective view of an exemplary tire servicing cage.

As shown in FIG. 1, frame assembly 102 may including a plurality of interconnected bars defining a top section 114, side sections 116, a front section 118, and a rear section 120. Frame assembly 102 may range in length "L" from about fifty inches to about seventy inches, and preferably between about fifty-five inches and about sixty-five inches. In one embodiment, frame assembly 102 may be approximately sixty inches long. Further, a width "W" of frame assembly 102 may range from about forty inches to about fifty inches. In one embodiment, frame assembly 102 may be approximately forty-eight inches wide.

In addition, as detailed above, frame assembly may be configured to move between closed position 110 and open position 112. In closed position 110, a height "H" of frame assembly 102 may be between about thirty inches and about forty inches. In one embodiment, closed position 110 of frame assembly 102 may have a height of approximately thirty-eight inches. In open position 112, height of frame assembly 102 may be between about seventy inches and about ninety inches. In one embodiment, height of frame assembly 102 in open position 112 may be about eighty inches.

As shown in the illustrated figures, one or more section 114, 116, 118, 120 of frame assembly 102 may include a layer of mesh material 122. Mesh material 112 may be configured to prevent debris from discharging outside said cage 100. In particular, mesh material 112 may be formed of wire mesh, of interconnected bands, bars, or rods, or of perforated sheet metal made of apertured or perforated sheet metal components. In one embodiment, mesh material 104 is an expanded metal having a thickness ranging between about of four gauge to about ten gauge, and preferably about six gauge in thickness. While the perforations of mesh material 112 is shown as diamond shaped, other shapes are contemplated, such as square, circular, triangular, and the like.

Front Section 118

As show in FIGS. 1-4, front section 118 may be secured to side sections 126. More specifically, a locking mechanism 126 may be configured to detachably secure front section 114 to side sections 116. As shown, locking mechanism 126 may include one or more jaws 128 movable by a manual actuator 130, such as a slide, handle, or lever. As shown, actuator 130 may include recesses and grooves to accommodate the fingers of a user. Further, actuator 130 may transmit motion to the one or more jaws 128 by a spring, such as a coil or leaf spring, to facilitate securing or releasing jaws 128 to one or more pins 133 of frame assembly 102.

Figure 2:
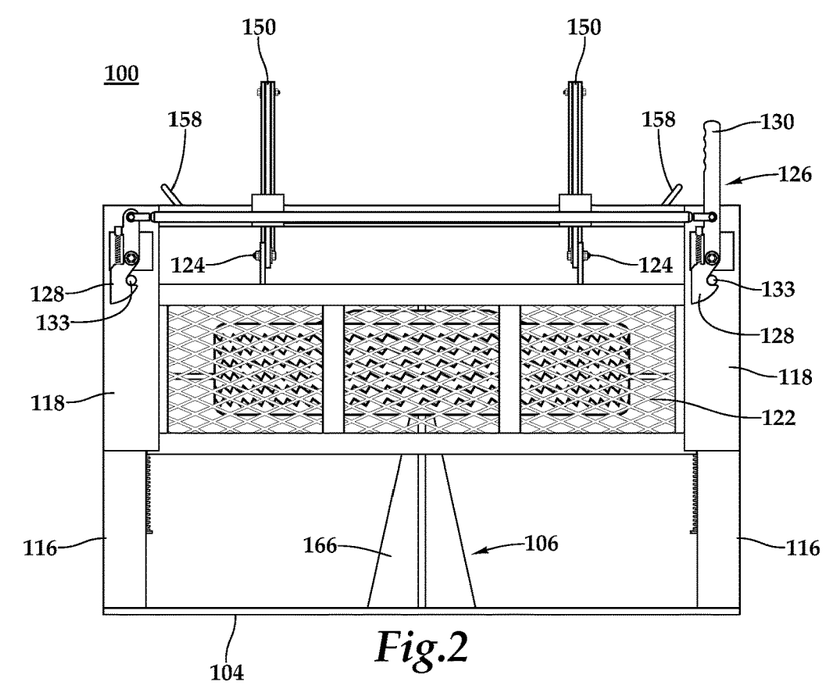
FIG. 2 is a front view of the exemplary cage of FIG. 1.
Figure 3:
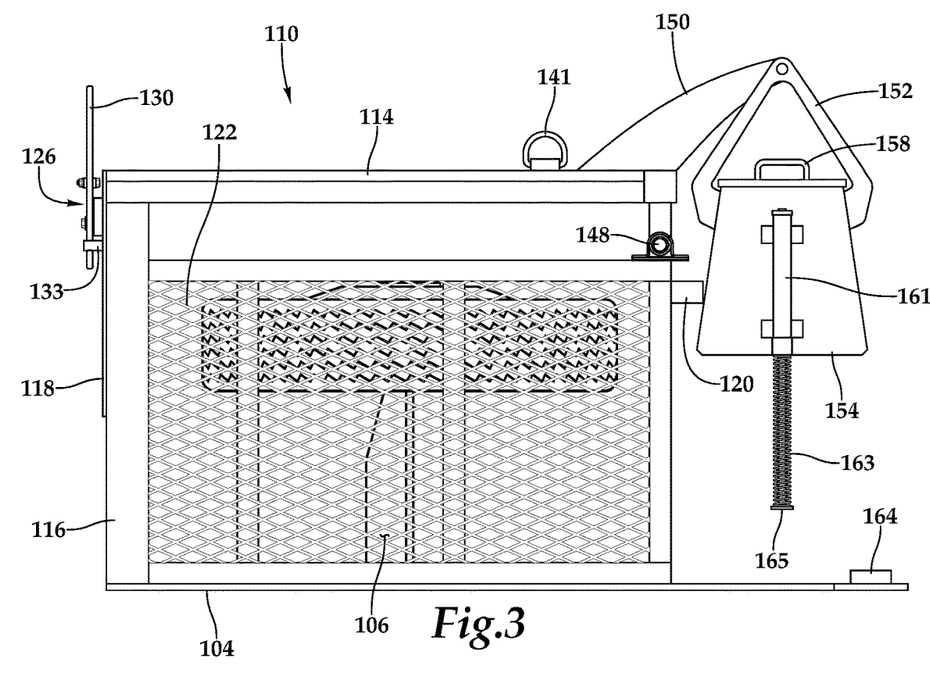
FIG. 3 is a side view of the exemplary cage of FIG. 1 in a closed configuration.
Figure 4:
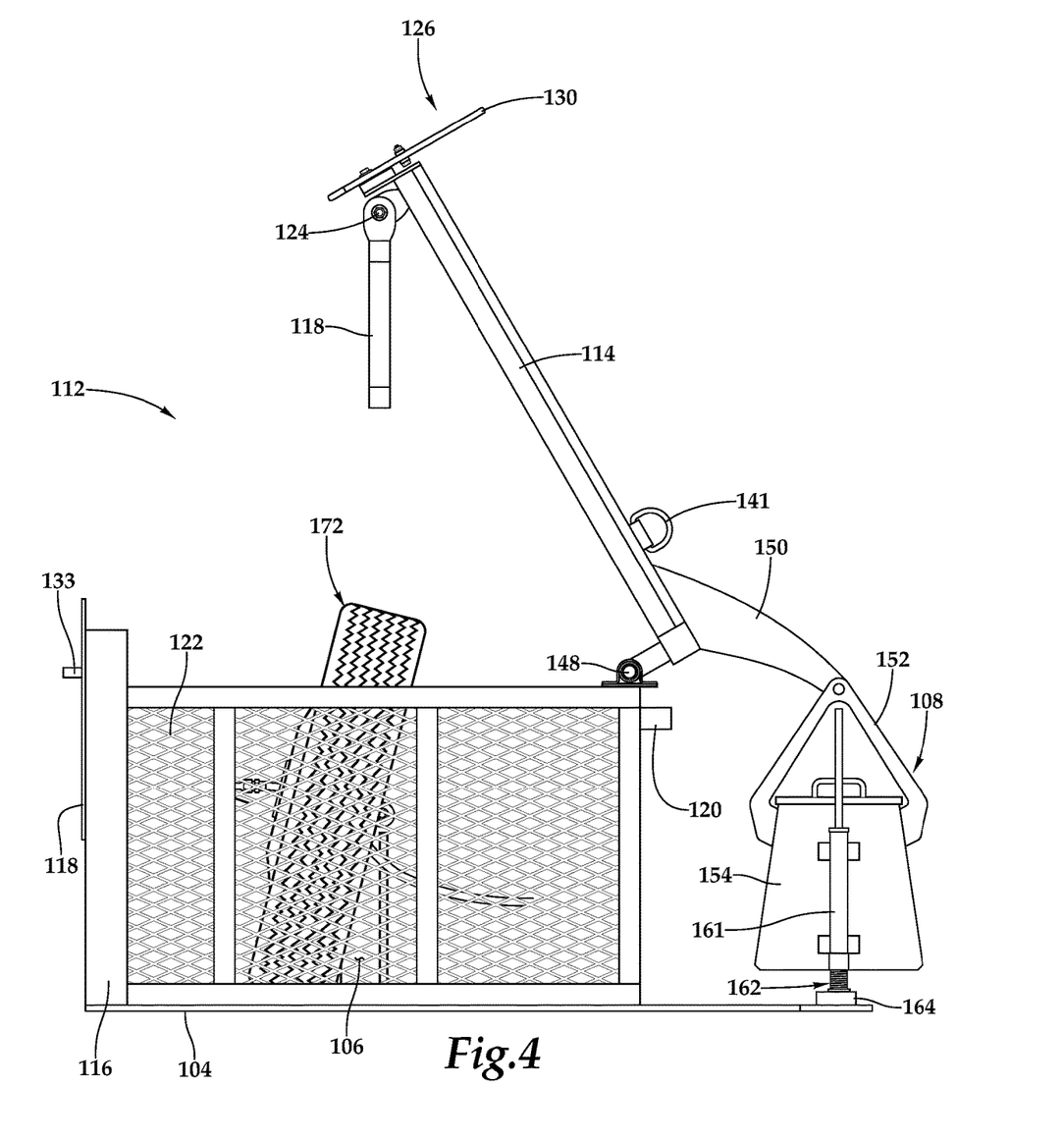
FIG. 4 illustrates the exemplary cage of FIG. 1 in an open configuration.

As illustrated in FIGS. 1-3, front section 118 may further couple with top section 114. In particular, front section 118 may be pivotably coupled to top section 114 via one or more bearings 124. Bearings 124 may be rigidly attached to top section 114 such that front section 118 is configured to pivot about a pivot axis. In addition, front section 118 may include a handle 132 to facilitate moving cage 100 between a closed position 110 (FIG. 3) and an open position 112 (FIG. 4) once locking mechanism 126 is released.

As shown in FIG. 2, front section 118 may be about half the height of side section 116 such that front section 118 is a distance above base plate 104. In particular, a height of front section 118 may range between about ten inches and about thirty inches, and preferably between about fifteen inches and about twenty inches. In one embodiment, front section 118 may be about sixteen inches in height. Further, front section 118 may range in length between about forty inches and about sixty inches, and preferably between about forty-five inches and about fifty-five inches. In one embodiment, front section 118 may be about fifty-two inches in length.

Top Section 114

Figure 5:
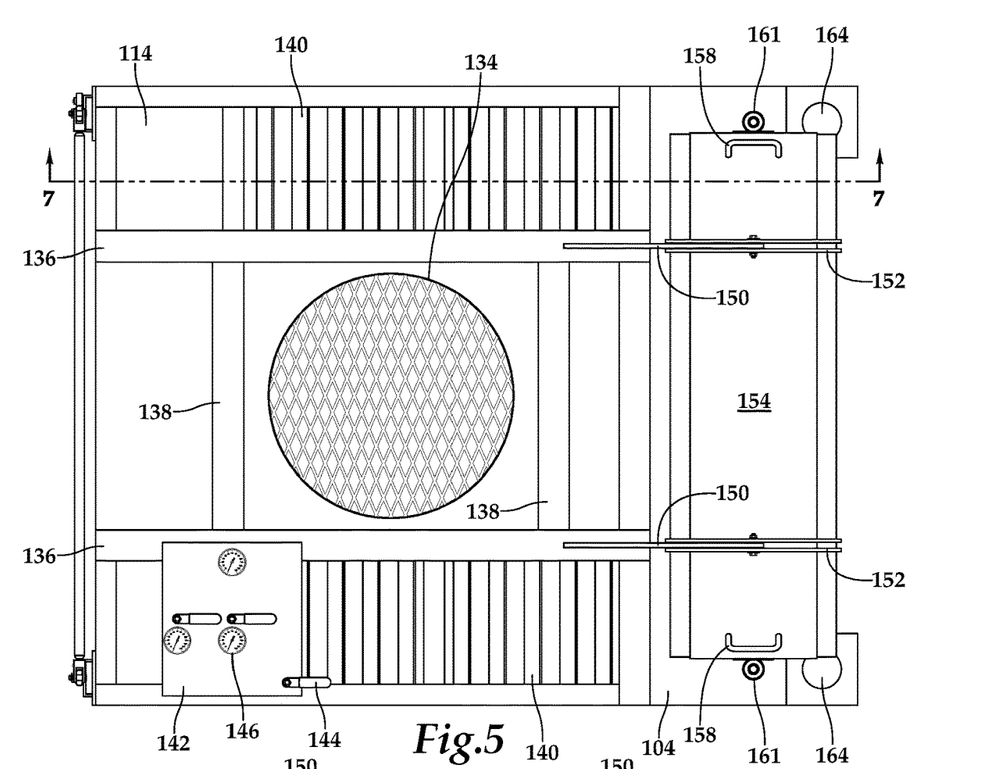
FIG. 5 is a top view of the exemplary cage of FIG. 1.
Figure 6:
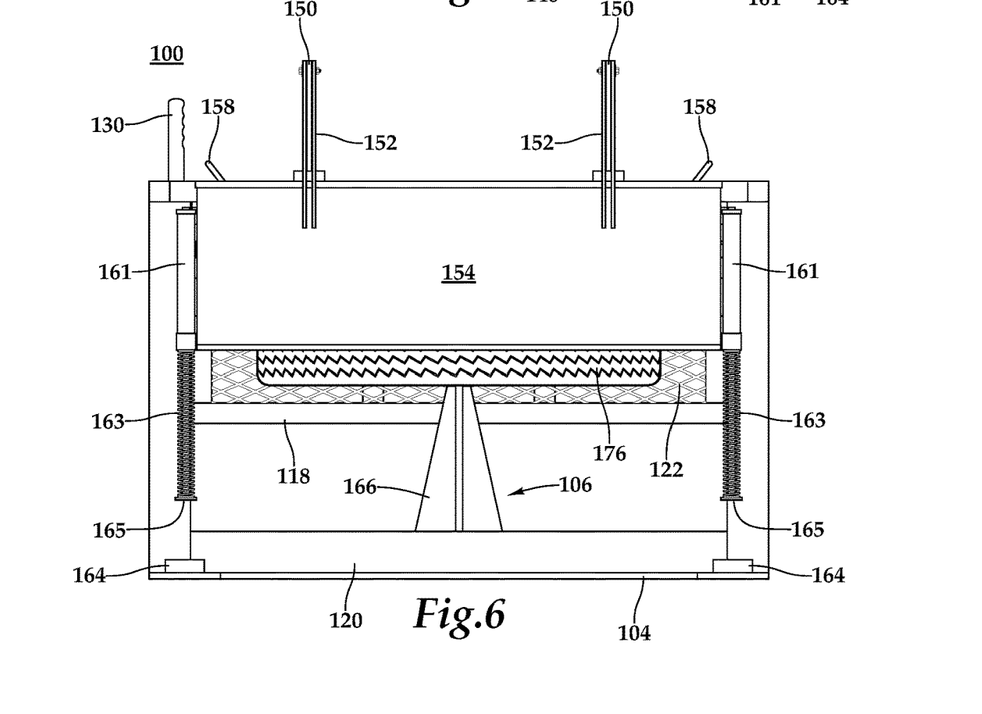
FIG. 6 is a rear view of the exemplary cage of FIG. 1.
Figure 7:
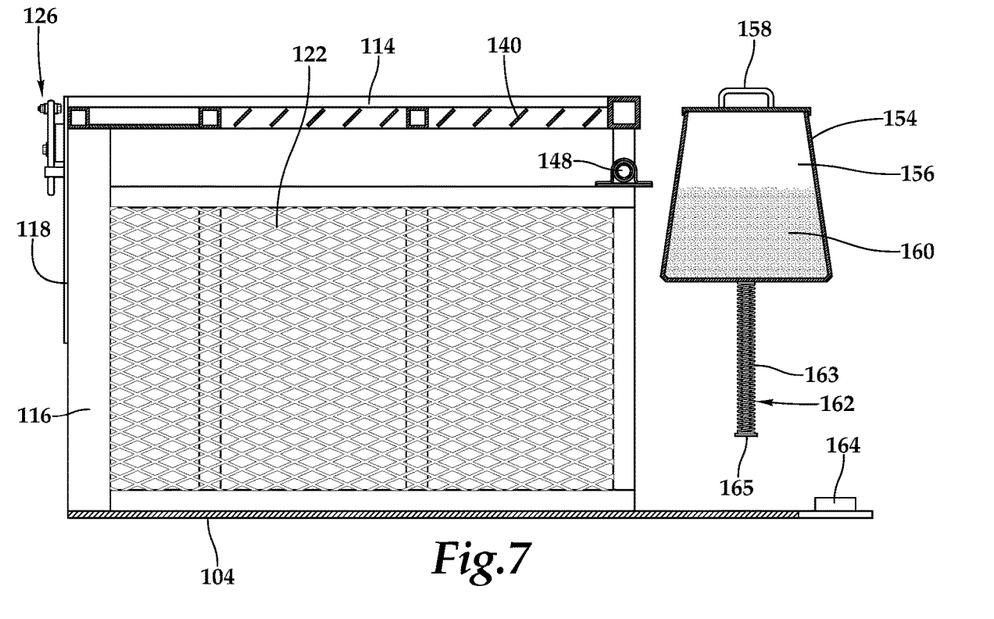
FIG. 7 is a sectional view of the exemplary cage of FIG. 1.

FIG. 5 illustrates a top view of cage 100. As shown, top section 114 may include a centralized opening 134. As mentioned above, mesh material 122 may be secured to top section 114 to, for example, prevent debris or other tire components from escaping via opening 134. A diameter of opening 134 may be between about twenty and about thirty inches, and preferably about twenty-five inches. Although opening 134 is illustrated as circular in shape, other shapes are contemplated.

Further, as shown in FIG. 1 and FIG. 5, cage 100 may include vertical rails 136 and horizontal rails 138 extending along top section 114. Rails 136, 138 may be hollow bars or tubes arranged to surround opening 134. In particular, vertical rails 136 may extend from a front to a rear of top section 114. Horizontal rails 138 may be secured to vertical rails 136 to, for example, form a raised barrier around opening 134.

As shown, one or more eyelets 141, such as a D-ring, may be secured to vertical rails 136. Eyelets 141 may facilitate connecting with, for example, a hook of a crane, hoist, winch, trolley, and the like for moving cage 100.

It is further contemplated that top section 114 may include a plurality of panels or partitions 140. Panels 140 may extend outwardly from vertical bars 136 toward either side of top section 114. In particular, panels 140 may extend between about ten inches and about fifteen inches from vertical bars 136, and preferably extend about twelve inches. Further, panels 140 may be angled to, for example, direct any debris discharged from interior of cage 100 toward the rear. For instance, panels 140 may be angled between about thirty degrees and about sixty degrees relative to top section 114.

As shown in FIG. 1 and FIG. 5, a control panel 142 may be secured to top section 114. Control panel 142 may include one or more controls or levers 144 configured to open and close one or more feed lines coupled to, for example, a pressurized air supply. Feed lines may correspond to one or more air valves, such as a regulated air valve, an unregulated air valve, and a bleed valve. For example, regulator and unregulated (e.g., shop air) valves may be used to inflate a tire to a desired pressure. Bleed valve may be used to deflate a tire in case of over inflation. Further, control panel 142 may include one or more pressure gauges 146 to measure or regulate air pressure.

Moreover, top section 114 may be pivotably coupled to side sections 116 via one or more bearings 148. Bearings 148 may be rigidly attached to side section 116 such that top section 114 is configured to rotate about a rotation axis. As a result of this rotation, as mentioned above, cage 100 may be moved between a closed position 110 (FIG. 3) and an open position 112 (FIG. 4).

Counterweight Assembly 108

As shown in FIGS. 1-6, counterweight assembly 108 may be coupled to top section 114 via one or more coupling arms or fins 150. Fins 150 may be secured to vertical rails 136 of top section 114. Further, fins 150 may pivotably couple with brackets 152 of counterweight assembly 108 for rotating about a counterweight axis.

More specifically, brackets 152 may extend upwardly from a housing 154 of counterweight assembly 108. Housing 154 may include a compartment 156 accessible via one or more handles 158 be filled with a material or substance 160 with a high mass density. Examples of a high mass density substance may include sand, metal or liquids, such as water.

As shown in FIGS. 3-4, one or more biasing members 162 may be coupled to sides of housing 154 via a sleeve 161. Biasing members 162 may include a spring 163 and supports 165 configured to move in and out of sleeve 161. Spring 163 may be a coil or helical spring, a torsion spring, a conical spring, a flat spring, and a cantilever spring. Biasing members 162 may be configured to store and release mechanical energy to facilitate moving cage 100 from open position 112 to closed position 110. For example, biasing members 162 may support the weight of the housing 154 such that when lowered, biasing members 162 may provide an upward bias, thereby allowing for movement of cage 100 to closed position 110 with minimum force.

It is further contemplated that cage 100 may include one or more buffers 164 to absorb or damper impact with counterweight assembly 108. For instance, as shown, buffers 164 may be formed of an elastic material and arranged on base plate 104 for receiving one or more components of counterweight assembly 108. Alternatively, buffers may be arranged on a bottom of housing 154.

Base Plate 104 and Post Member 106

Returning to FIG. 1, frame assembly 102 may be secured to base plate 104. As shown, base plate 104 may have a length "L" similar to that of frame assembly 102 and a width "W" that extend past rear section 120 of frame assembly 102. More specifically, a width of base plate 104 may be between about fifty inches and about seventy inches, and preferably be about sixty inches wide. Further, a thickness of base plate 104 may be between about one-half inch and about one inch. In one embodiment, base plate 104 may have a thickness of about five-eights inches.

Figure 8:
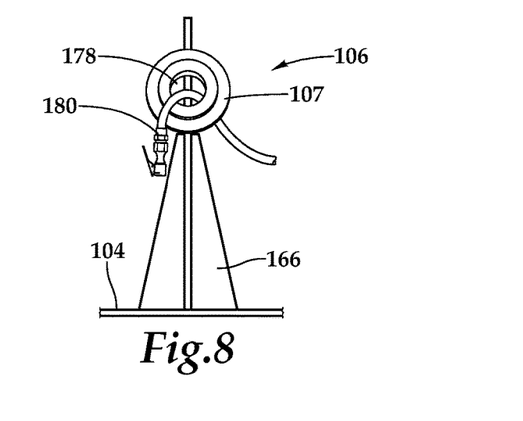
FIG. 8 illustrates a post member of the exemplary cage of FIG. 1.
Figure 9:
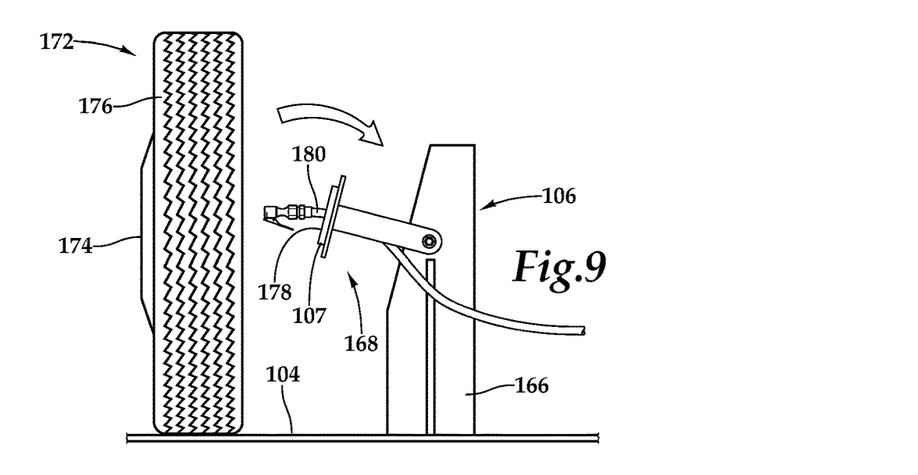
FIG. 9 is a side view of the post member of the exemplary cage of FIG. 1.
Figure 10:
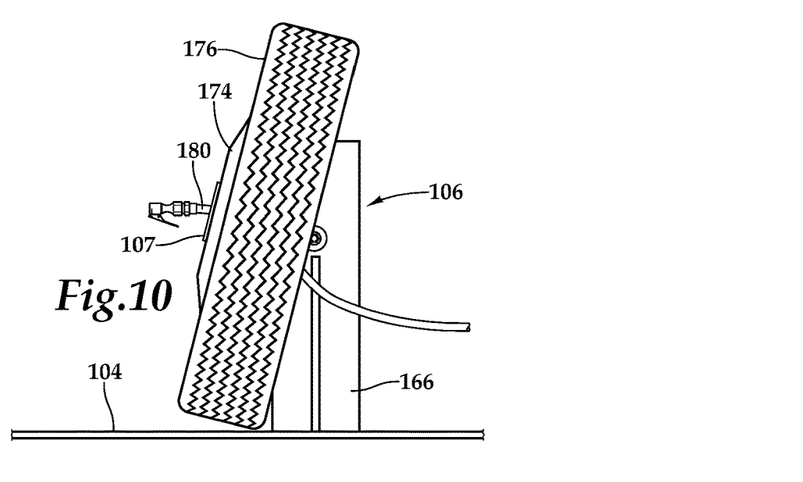
FIG. 10 illustrates post member in a receiving position.
Figure 11:
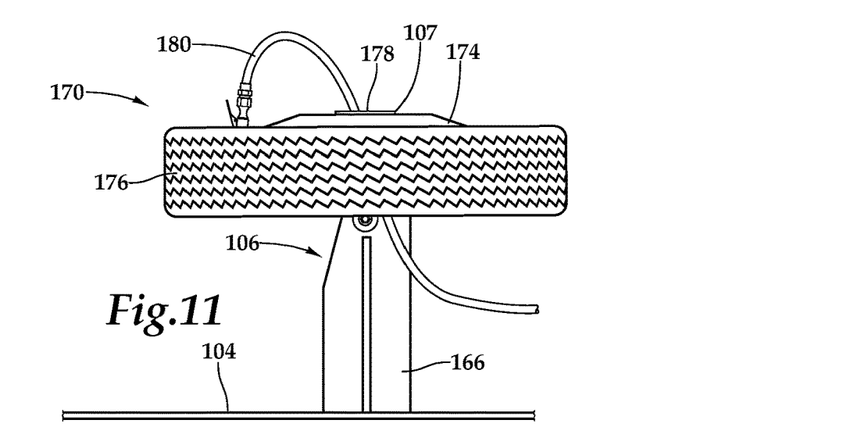
FIG. 11 illustrates post member in a tire servicing position.

As shown in FIGS. 8-11, post member 106 may extend upwardly from base plate 104 and arranged within frame assembly 102. Post member 106 may include one or more supports 166 pivotably coupled to circular head 107. In particular, circular head 107 may freely pivot between a tire receiving position 168 and a tire servicing position 170. As shown in FIG. 8 and FIG. 9, in receiving position 168, circular head 107 may be substantially perpendicular or slightly angled relative to base plate 104. As shown in FIG. 11, in servicing position 170, circular head 107 may be substantially parallel to base plate 104. It is further contemplated that circular head 107 may be locked or unlocked. For example, an operator may lock circular head 107 in servicing position 170 by turning circular head 107 clockwise. To unlock, the operator may simply turn circular head 107 counterclockwise.

FIGS. 8-11 illustrate an exemplary method of using cage 100. As a first step of the method, cage 100 may be arranged in open position 112. As shown in FIG. 8, a first step of the method may include placing circular head 107 in tire receiving position 168. As shown in FIG. 9, a wheel assembly 172 including a rim 174 and tire 176 may then be rolled onto base plate 104. Next, wheel assembly 172 may be position such that an interior of the rim 174 is aligned with a face of circular head 107. As shown in FIG. 10, wheel assembly 168 may lean against post member 106. Then, as shown in FIG. 11, circular head 107 may be configured to move into servicing position 170 to, for example, seat rim 174 onto tire 176 and/or inflate tire 176.

As further illustrated in FIGS. 9-11, circular head 107 may include an opening or channel 178 configured to receive an air hose 180. Air hose 180 may be in fluid communication with a pump or motor configured to distribute pressurized air. Upon Air hose 180 may then transfers pressurized air to, for example, inflate tire 176. Air hose 180 may include any flexible, coiled, or otherwise bendable hose suitable for transferring air. It is contemplated that transfer of air from the air hose 180 to tire 176 may be facilitated by a valve stem connector. The valve stem connector may connect to, for example, a valve stem of tire 176, inner tube or any other inflatable object.

Bead Seating Device 200

FIGS. 12-18 illustrate an exemplary bead seating device 200 configured to, for example, seat rim 174 onto tire 176. Bead seater 200 may be configured to direct pressurized gas into an interior cavity of tire 176 to help seat a bead of the tire onto rim 176. As shown in FIGS. 12-18, bead seater 200 may be removably coupled to cage 100.

Figure 12:
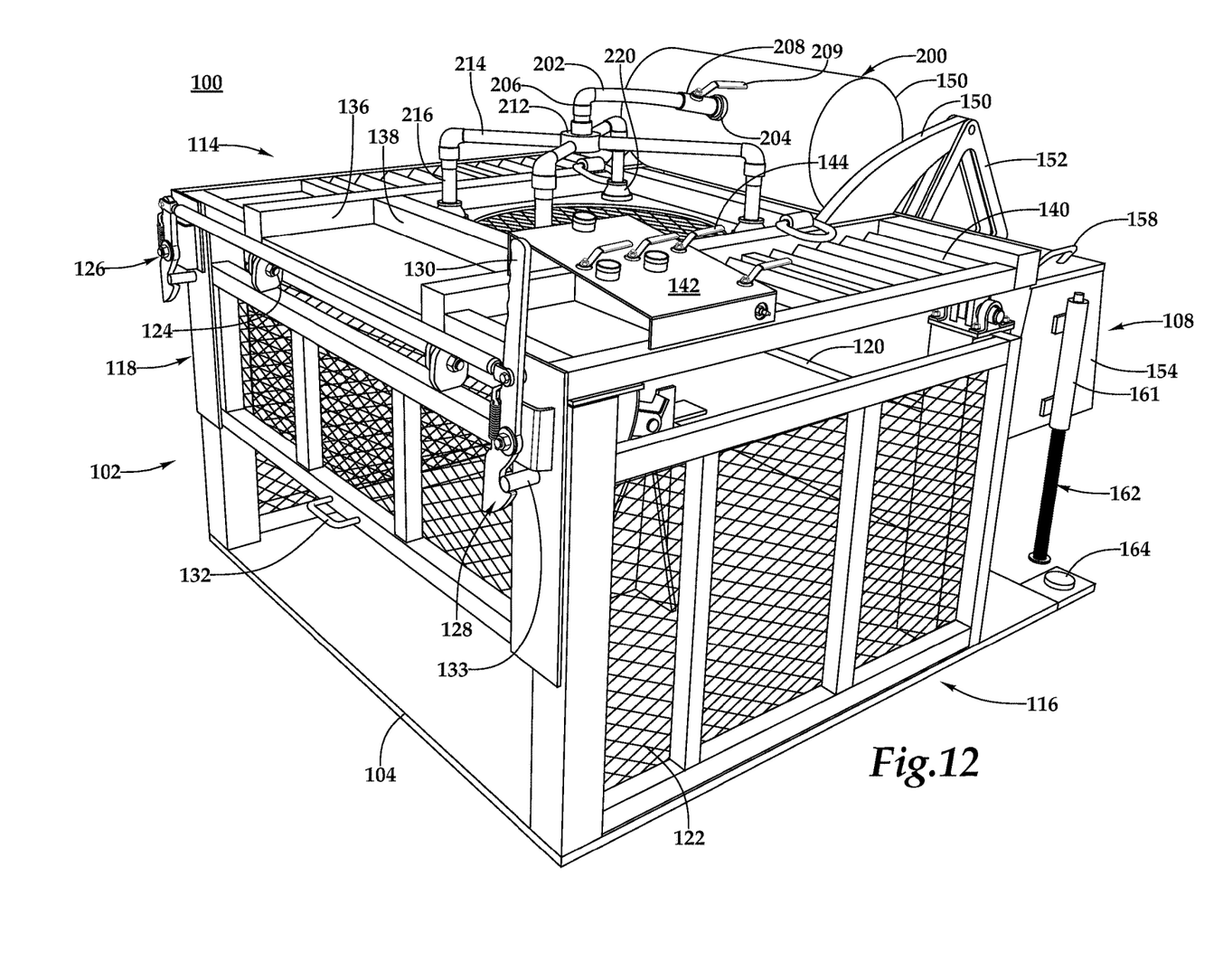
FIG. 12 illustrates the cage of FIG. 1 including a bead seating device.
Figure 13:
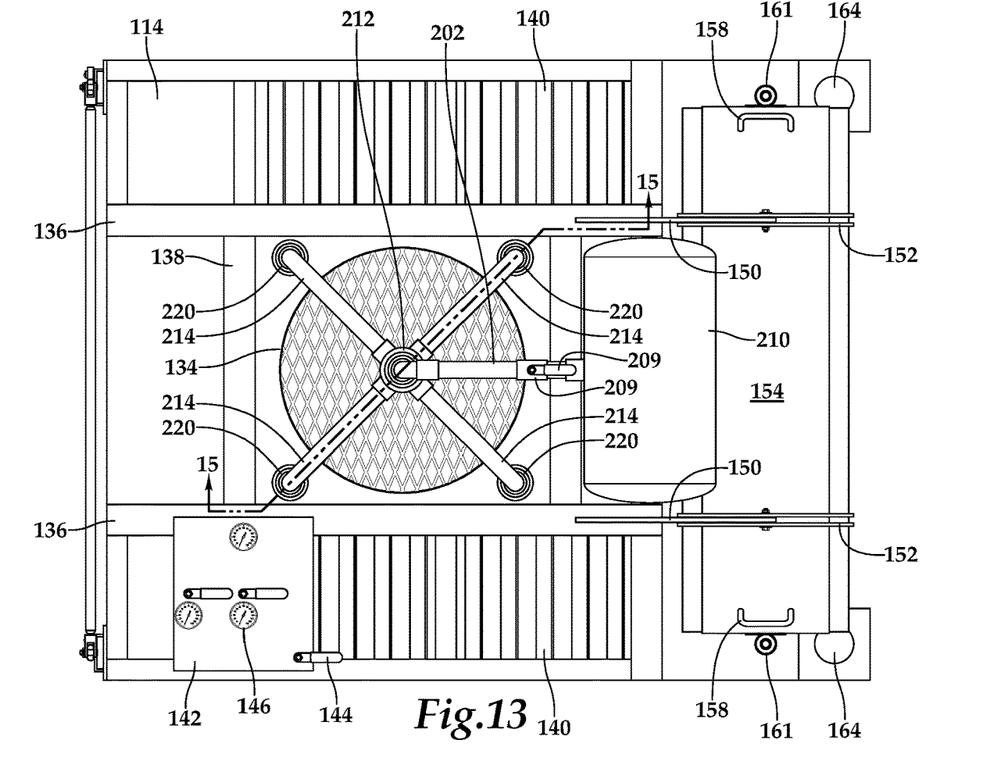
FIG. 13 is a top view of the cage of FIG. 1 including the bead seating device of FIG. 12.
Figure 14:
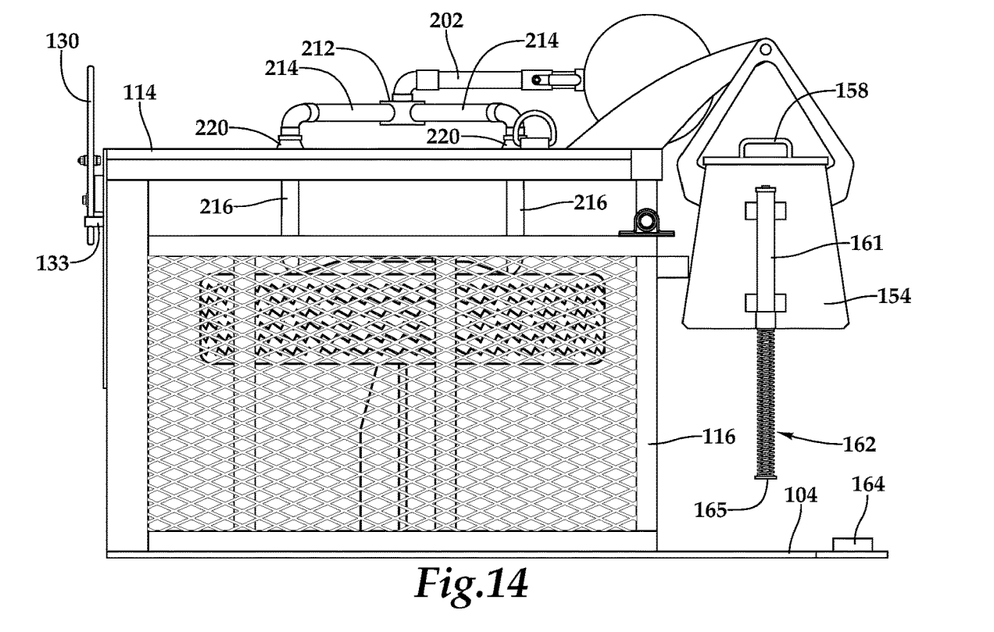
FIG. 14 illustrates the cage of FIG. 1 in a closed configuration including the bead seating device of FIG. 12.

As shown in FIG. 12, bead seater 200 may include an inlet 202 including an intake end 204 and a supply end 206. Intake end 204 may include a valve 208 configured to couple with a source, such as an air tank 210, capable of producing a high pressure compressed gas, such as air. Valve 208 may be configured to control a flow of said pressurized gas from tank 210, such as via lever 209.

As shown, supply end 206 may be coupled to a splitter 212. Splitter 212 may be configured to split a stream of pressurized gas into a plurality of outlet streams. Outlet streams of pressurized gas may be distributed through two or more outlets 214 connected to and radially extending from splitter 212. A length of outlets 214 may range between about ten inches and about fifteen inches. In one embodiment, outlets 214 may have a length of about twelve inches.

As shown, bead seater 200 may include four outlets 214 arranged, for example, in the form of spider legs such that an angle of about ninety degrees is created between each outlet along a longitudinal axis. Other quantities and arrangements of outlets 214 are contemplated.

Further, each outlet 214 may include a leg 216. Legs 216 may extend downwardly from each corresponding outlet 214 into an interior of cage 100. As shown in FIGS. 14-17, in certain embodiments, legs 216 may extend into an interior of cage 100. For example, legs 216 may extend through one or more tips 220 into one or more holes 218 of top section 114. As shown, tips 220 extend upwardly from top section 114 and may guide legs 216 into corresponding holes 218.

A length of legs 216 may range between about five inches and about ten inches. In one embodiment, legs 216 may have a length of about eight inches. It is further contemplated that legs 216 may be extendable relative to each outlet 214 to, for example, accommodate for tires and rims of various dimensions. For instance, legs 216 may include a plurality of telescoping members having a decreasing diameter such that each leg 216 may be extendable between about two inches and about twenty inches, and preferably between about five inches and about ten inches. Telescoping members may be a flexible material that acts as a bearing and accommodates slight misalignment to prevent air leaks.

Further, as shown in FIGS. 15-18, each leg 216 of bead seater 200 may be rotatably coupled to a nozzle 222. Nozzles 222 may be constructed from sheet metal such as steel, aluminum or other metal or may be molded or fabricated from engineering plastics or cast from metal. Nozzles 222 may include an outlet port 224. Outlet port 224 may be angled relative to legs 216.

Figure 16:
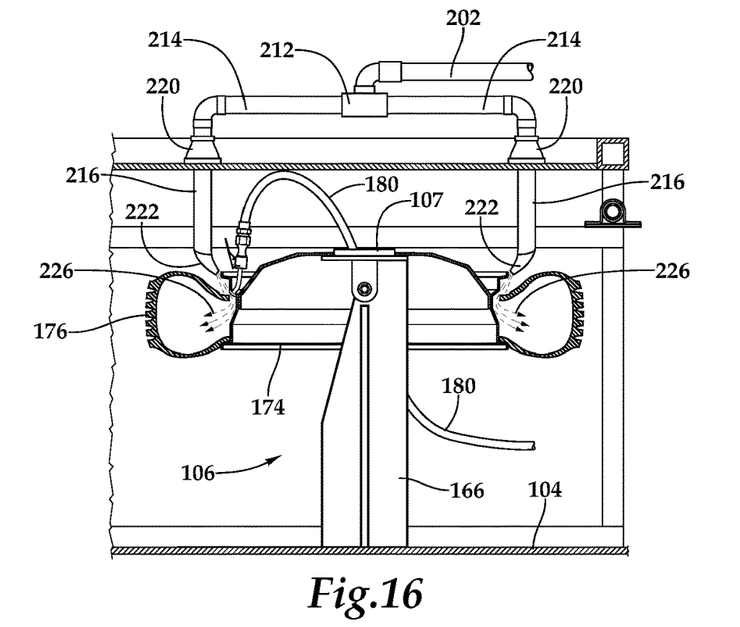
FIG. 16 illustrates the bead seating device of FIG. 12 arranged to direct a pressurized gas into a cavity of a tire.
Figure 17:
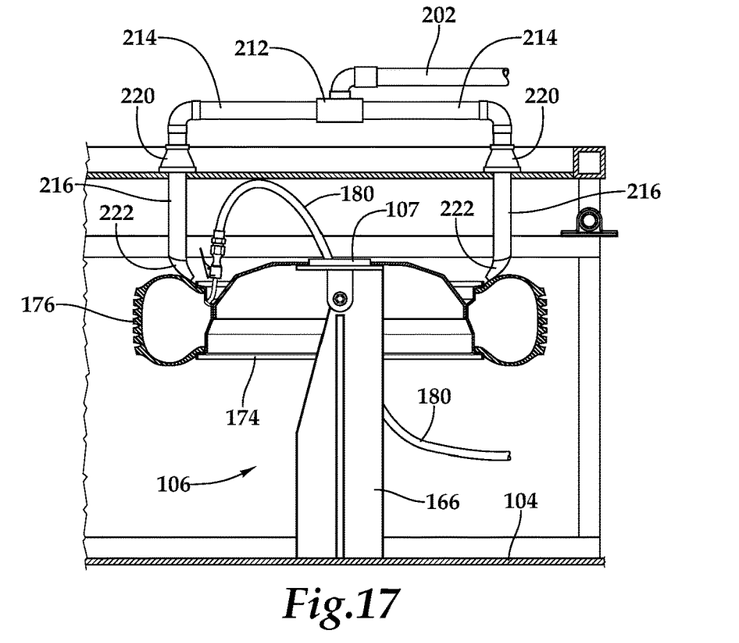
FIG. 17 illustrates seating a bead of a tire on a rim via the bead seating device of FIG. 12.

FIG. 15 and FIG. 16 illustrate tire 176 on post member 106 in servicing position 170. As shown, nozzles 222 may direct a pressurized gas 226 into an interior cavity 228 of tire 176. Further, as shown in FIG. 17, pressurized gas 226 blown into cavity 228 may create a pressure differential, thereby pushing the bead against the lip to seal tire 176 to the rim 174. Once wheel assembly 172 is properly seated, an operator may inflate tire 176, such as via air hose 180.

Figure 18:
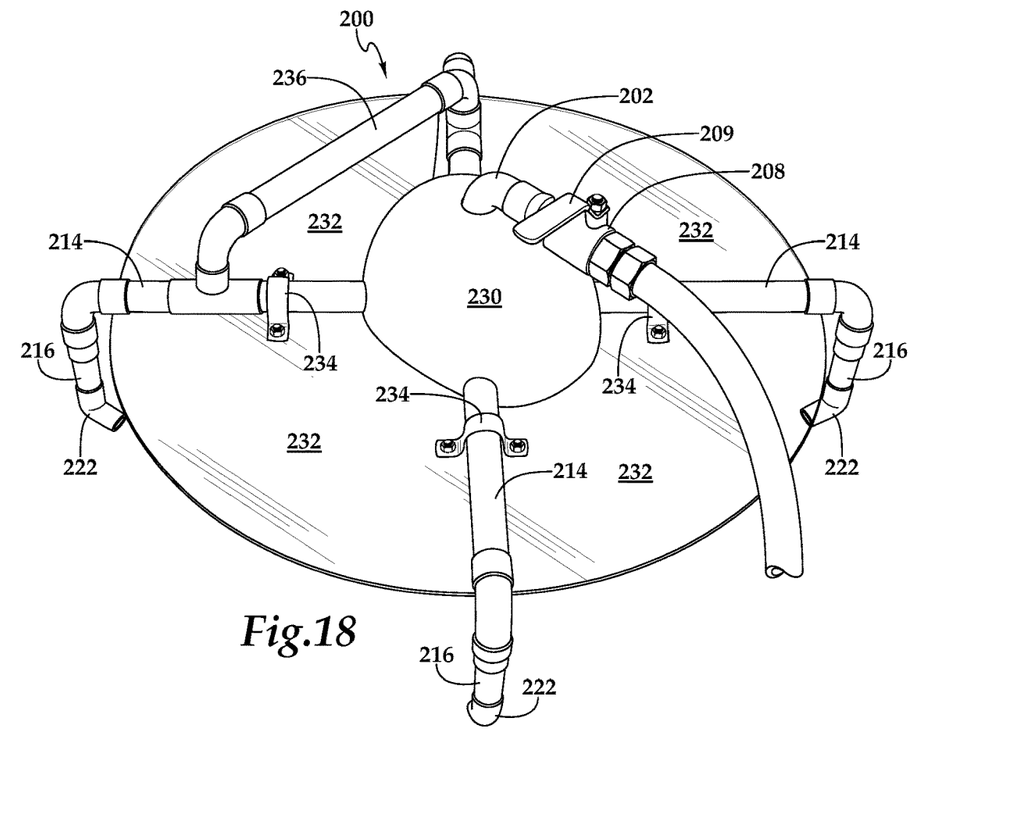
FIG. 18 illustrates exemplary additional components of the bead seating device of FIG. 12.

FIG. 18 illustrates additional components of bead seater 200. As shown, bead seater 200 may include a shell 230. Shell 230 may cover splitter 212 and a portion of inlet 202 and outlets 214. In particular, inlet 202 may extend upwardly from shell 230. Further, outlets 214 may extend outwardly from shell 230. Although shell 230 is shown as semicircular in shape, other shapes are contemplated.

Further, bead seater 200 may include one or more screens 232. Screens 232 may be configured to, for example, deflect pressurized air and nearby debris. As shown, screens 232 may be arranged between outlets 214. A strap 234 may be configured to secure adjacent screens 232 to one another. Screens 232 may be formed of an acrylic, epoxy or other clear plastic material such that a user may operate bead seater 200 when detached from cage 100.

As further shown in FIG. 18, bead seater 200 may include a handgrip 236. Handgrip 236 may extend from and be secured to two or more outlets 214. Handgrip 236 may be made of the same or a different material as other components of bead seater 200. Moreover, handgrip 236 may assist an operator in moving and selectively positioning nozzles 222 with minimum effort to accommodate wheel assemblies of different shapes and sizes. A length of handgrip 236 may range between about five inches and about twenty inches, and preferably between about ten inches and about fifteen inches. In one embodiment, handgrip 236 is approximately twelve inches in length.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Elements and materials may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

What is claimed is:

1. A tire servicing cage, comprising:
    a frame assembly including a plurality of bars defining a top section, side sections, a front section, and a rear section;
    a locking mechanism configured to detachably secure said front section to said side sections, wherein said locking mechanism includes one or more jaws movable by a manual actuator, said actuator configured to transmit motion to the one or more jaws to facilitate securing or releasing said jaws to one or more pins extending outwardly from the frame assembly;

a base plate secured to said frame assembly;

a post member attached to and extending upwardly from said base plate, said post member including a pivotable head configured to receive a rim of a tire; and a counterweight assembly coupled to said top section of said frame assembly, wherein said top section includes one or more cavities configured to receive one or more legs of a tire bead seater, and wherein said counterweight assembly is configured to facilitate moving said frame assembly between a closed configuration and an open configuration.

2. The tire servicing cage of claim 1, further including a layer of mesh material secured to one or more sections of said frame assembly, said mesh material configured to prevent debris from discharging outside said frame assembly.

3. The tire servicing cage of claim 2, wherein said mesh material is an expanded metal.

4. The tire servicing cage of claim 1, wherein said post member further including a central channel configured to receive an air hose for inflating or deflating the tire.

5. The tire servicing cage of claim 1, further comprising a control panel secured to said frame assembly, said control panel including one or more controls configured to open and close one or more feed lines.

6. The tire servicing cage of claim 5, wherein said one or more feed lines corresponds to at least one of a regulated air valve, an unregulated air valve, and a bleed air valve.

7. The tire servicing cage of claim 1, wherein said top section of said frame assembly is pivotably coupled to said front section.

8. The tire servicing cage of claim 1, wherein said top section further comprising a plurality of angled panels for deflecting debris.

9. The tire servicing cage of claim 1, wherein said tire bead seater is removably coupled to said frame assembly.

10. The tire servicing cage of claim 1, wherein said base plate extends past said rear section of said frame assembly.

11. The tire servicing cage of claim 1, wherein said base plate further includes one or more buffers configured to absorb impact with said counterweight assembly.

12. The tire servicing cage of claim 1, wherein said counterweight assembly further includes a compartment for receiving a substance.

13. The tire servicing cage of claim 1, wherein said post member is configured to pivot to a position substantially parallel to said base plate.

14. The tire servicing cage of claim 1, wherein a distance between said side sections of said frame assembly is between about fifty inches and about seventy inches.

15. The tire servicing cage of claim 1, wherein a height of said frame assembly in said closed configuration is between about thirty inches and about forty inches.

16. The tire servicing cage of claim 1, wherein a height of said frame assembly in said open configuration is between about seventy inches and about ninety inches.

17. A tire servicing cage, comprising:

a frame assembly including a plurality of bars defining a top section, side sections, a front section, and a rear section;

a locking mechanism configured to detachably secure said front section to said side sections, wherein said locking mechanism includes one or more jaws movable by a manual actuator, said actuator configured to transmit motion to the one or more jaws to facilitate securing or releasing said jaws to one or more pins extending outwardly from the frame assembly;

a base plate secured to said frame assembly;

a post member attached to and extending upwardly from said base plate, said post member including a pivotable head configured to receive a rim of a tire; and a counterweight assembly coupled to said top section of said frame assembly, wherein said top section includes one or more cavities configured to receive one or more legs of a tire bead seater, and wherein said counterweight assembly is configured to facilitate moving said frame assembly between a closed configuration and an open configuration and further including one or more biasing members, said biasing members are configured to provide an upward bias to facilitate moving said frame assembly to the closed configuration with minimum force.

18. A tire servicing cage, comprising:

a frame assembly including a plurality of bars defining a top section, side sections, a front section, and a rear section;

a base plate secured to said frame assembly;

a post member attached to and extending upwardly from said base plate, said post member including a pivotable head configured to receive a rim of a tire;

a counterweight assembly coupled to said top section of said frame assembly, wherein said counterweight assembly configured to facilitate moving said frame assembly between a closed configuration and an open configuration; and a tire bead seater removably coupled to said frame assembly, wherein said top section includes one or more cavities configured to receive one or more legs of said tire bead seater.

* * * * *